United States Patent [19]

Yanagawa et al.

[11] Patent Number: 5,402,279
[45] Date of Patent: Mar. 28, 1995

[54] TRACKING APPARATUS FOR HELICAL SCAN VIDEO TAPE RECORDERS

[75] Inventors: Yoshifumi Yanagawa, Kyoto; Tadashi Kunihira, Osaka; Hiroshi Mitani, Daito, all of Japan

[73] Assignee: Matsushita Electric Industrial Co., Ltd., Osaka, Japan

[21] Appl. No.: 164,701

[22] Filed: Dec. 10, 1993

[30] Foreign Application Priority Data

Dec. 11, 1992 [JP] Japan .................................. 4-331524

[51] Int. Cl.⁶ .......................... G11B 21/02; H04N 5/78
[52] U.S. Cl. ................. 360/77.16; 360/10.2; 360/10.3
[58] Field of Search ............... 360/77.16, 75, 77.13, 360/10.2, 10.3, 77.12, 109, 107

[56] References Cited

U.S. PATENT DOCUMENTS

| 4,462,049 | 7/1984 | Heitmann | 360/77.16 X |
| 4,656,529 | 4/1987 | Sakamoto | 360/77.16 X |
| 5,057,949 | 10/1991 | Suga et al. | 360/77.16 X |
| 5,184,254 | 2/1993 | Kaneko et al. | 360/77.16 X |

FOREIGN PATENT DOCUMENTS 2-280480 11/1990 Japan .

Primary Examiner—Andrew L. Sniezek
Attorney, Agent, or Firm—Willian Brinks Hofer Gilson & Lione

[57] ABSTRACT

A tracking apparatus for helical scan video tape recorders comprises four movable video heads situated on a scanning drum such that phase compensation information can be determined using the scanner rotational information, the tape speed, and tape position. The phase compensation information is used to adjust the video heads thereby reproducing high quality video signals with smooth movement pictures from varying speed helical scan video tape recorders.

20 Claims, 5 Drawing Sheets

FIG. 2(c) STILL PATTERN 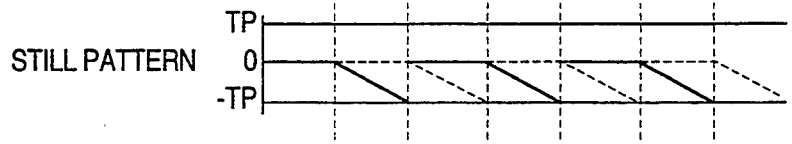
FIG. 2(d) VELOCITY PATTERN 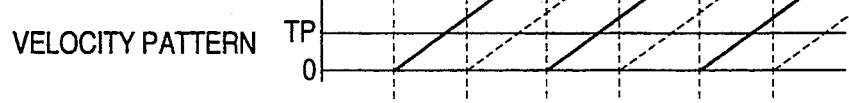
FIG. 2(e) PHASE PATTERN 
FIG. 2(f) DRIVING PATTERN 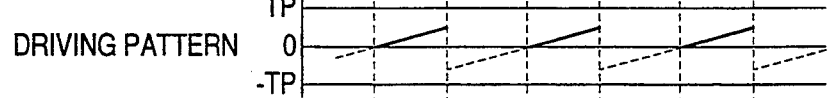

FIG. 4(c) STILL PATTERN

FIG. 4(d) VELOCITY PATTERN

FIG. 4(e) PHASE PATTERN

FIG. 4(f) DRIVING PATTERN

| AZIMUTH ANGLE OF REPRODUCE TRACK | L | L | R | R | L | L |
|---|---|---|---|---|---|---|
| REPRODUCE HEAD | 1 | 4 | 2 | 3 | 1 | 4 |

TRACKING APPARATUS FOR HELICAL SCAN VIDEO TAPE RECORDERS

BACKGROUND OF THE INVENTION

1. Field of the Invention

This invention relates to a tracking apparatus for helical scan video tape recorders, and in particular to a tracking apparatus for reproducing a video signal having smooth movement from varying speed helical scan video tape recorders.

2. Description of the Prior Art

In helical scan video tape recorders, to obtain noiseless reproduction during special operation modes such as still, slow, and fast motion, various types of tracking apparatus have been used which reposition the video heads along the recorded track. A tracking apparatus using video heads mounted on movable elements such as piezoelectricity type transducer can provide excellent performance for noiseless reproduction.

Tracking devices of the type described above provide important advantages in operation. Nevertheless, none of the conventional tracking devices can reproduce field, frame, and mixed field/frame smooth movement picture signals in a no guard-band helical scan video tape recorder system. Furthermore, none of the prior art helical scan recorders reproduce video signals with high quality varying speed reproduction having a smooth and natural movement.

SUMMARY OF THE INVENTION

According to this invention, a tracking apparatus for helical scan video tape recorders is provided which can reproduce video signals having natural and smooth movement at varying speeds. The tracking apparatus of this invention is composed of a scanning drum mounted with first and second movable units. Each of the movable units have mounted on them two video heads—one video head on each movable unit at an azimuth angle L and the other video head at an azimuth angle R. The video heads are positioned such that each video head on a particular movable unit is 180° diametrically opposite a video head on the other movable unit.

The rotational position of the scanning drum is detected by a scanner rotational timing pulse generator coupled to the shaft of the scanning drum. A tape speed detector coupled to a tape driving mechanism uses information from the tape driving mechanism to determine tape speed, and a tape position detector coupled to a sensor uses information from a sensor to determine tape position. Based on the outputs from the scanner rotational timing pulse generator, the tape position detector, and the tape speed detector, a head selector selects which of the recorded tracks, either angle L or angle R, scanned by the various video heads will be reproduced. Based on the output of the head selector a driver coupled to the first movable unit or a driver coupled to the second movable unit will receive phase compensation information of the track recorded on the magnetic tape in all rotation phase periods.

Accordingly, the tracking apparatus can reproduce field, frame, and mixed field/frame signals, thus reproducing a high quality picture having smooth movement.

Another object of the present invention is to provide a tracking apparatus for helical scan video tape recorders which can produce high quality varying speed reproduction from the start of the rotation phase by storing preliminary phase information and using that information in conjunction with the tape speed to predict which video head should be used to produce a smooth movement signal from the beginning of reproduction.

In accordance with the invention, the head selector calculates the position of the fixed video head by using the outputs of a first phase pattern generator and a second phase pattern generator. The error distance between the head reference position and the chosen video head is determined by the head selector and is stored into the first and the second memory as the estimated value for the start point of the preliminary duration period occurring prior to the rise or fall of the HSW signal. By using an estimated starting point for the video head the vibration of the video head due to movement is lessened, thus reproducing a smooth movement picture signal.

The invention itself, together with further objects and attendant advantages, will best be understood by reference to the following detailed description of the preferred embodiments taken in conjunction with the accompanying drawings.

DESCRIPTION OF THE PREFERRED EMBODIMENTS

Figure 1:
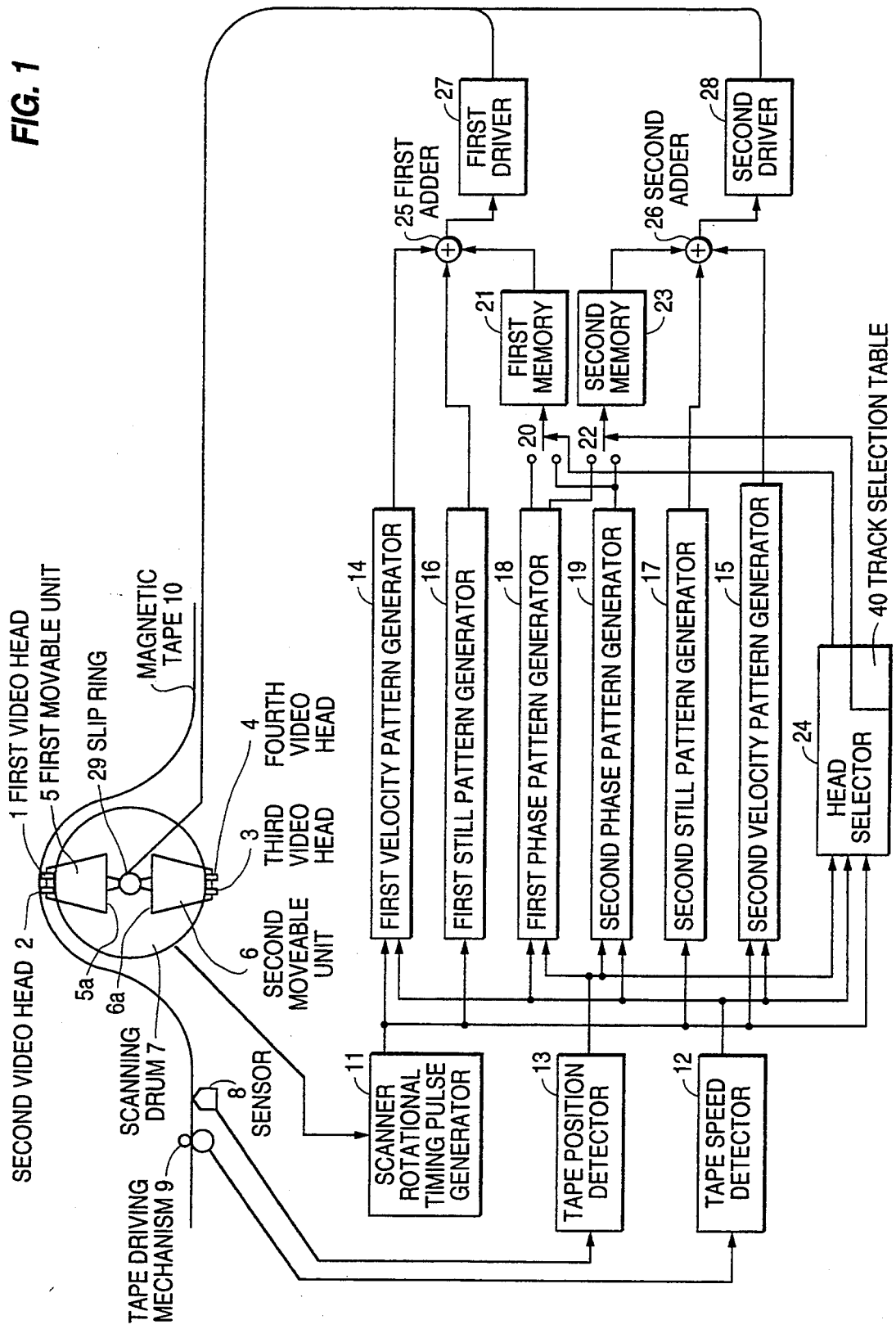
FIG. 1 is a block diagram of the preferred embodiment of the tracking apparatus for helical scan video tape recorders.

Turning now to the drawings, FIG. 1 shows an embodiment of the tracking apparatus for helical scan video tape recorders in accordance with the preferred embodiment of this invention and FIG. 2 shows waveforms occurring in the embodiment of FIG. 1. As shown in FIG. 1, a first video head 1 has a first azimuth angle (angle L), and is mounted on a first movable unit 5. A second video head 2 has a second azimuth angle (angle R), and is mounted on the first movable unit 5 with the first video head 1. A third video head 3 has the second azimuth angle, and is mounted on a second movable unit 6. A fourth video head 4 has the first azimuth angle, and is mounted on the second movable unit 6 with the third video head.

The movable units 5 and 6, for example, are electromechanical transducers such as electromagnetic type or a piezoelectricity type, which cause mechanical displacement to a free end of movable units 5 and 6 in proportion to the amplitude of the electric current or voltage applied to the electrode of the transducer. One end of the movable units 5 and 6 is fixed on opposite sides of a scanning drum 7, the fixed points of which are the points 5a and 6a, and the movable units 5 and 6 deflect the video heads mounted on the free end thereof in the direction of the scanning drum axis.

The first and third video heads 1 and 3 are precisely arranged 180° apart on diametrically opposite positions of the scanning drum 7. Similarly, the second and fourth video heads 2 and 4 are also precisely arranged 180° apart on diametrically opposite positions of the scanning drum 7.

A rotational position of the scanning drum 7 is detected by a scanner rotational timing pulse generator 11 coupled to the shaft of the scanning drum 7. Travelling speed of magnetic tape 10 is measured by means of a tape speed detector 12 from information from a tape driving mechanism 9, including a capstan and a pinch roller to cause tape movement. Traveling position of magnetic tape 10 is determined by means of a tape position detector 13, which processes tape traveling position information picked up from the tape 10 by a sensor 8.

Figure 2A:
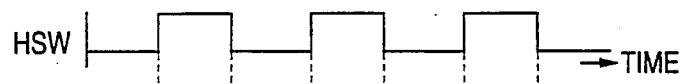
FIG. 2 is a diagrammatic view illustrating waveforms occurring during the operation of the embodiment shown in FIG. 1.

The scanner rotational timing pulse generator 11 produces a head switching signal (HSW signal), as shown in FIG. 2(a), utilized for switching the video heads. A period during which the value of the HSW signal is at a high level is considered a first rotation phase period. During the first rotation phase period, the first video head 1 and second video head 2 scan the magnetic tape 10. On the other hand, a period during which the value of the HSW signal is maintaining a low level is considered a second rotation phase period. During the second rotation phase period, the third video head 3 and fourth video head 4 scan the magnetic tape 10.

Figure 5:
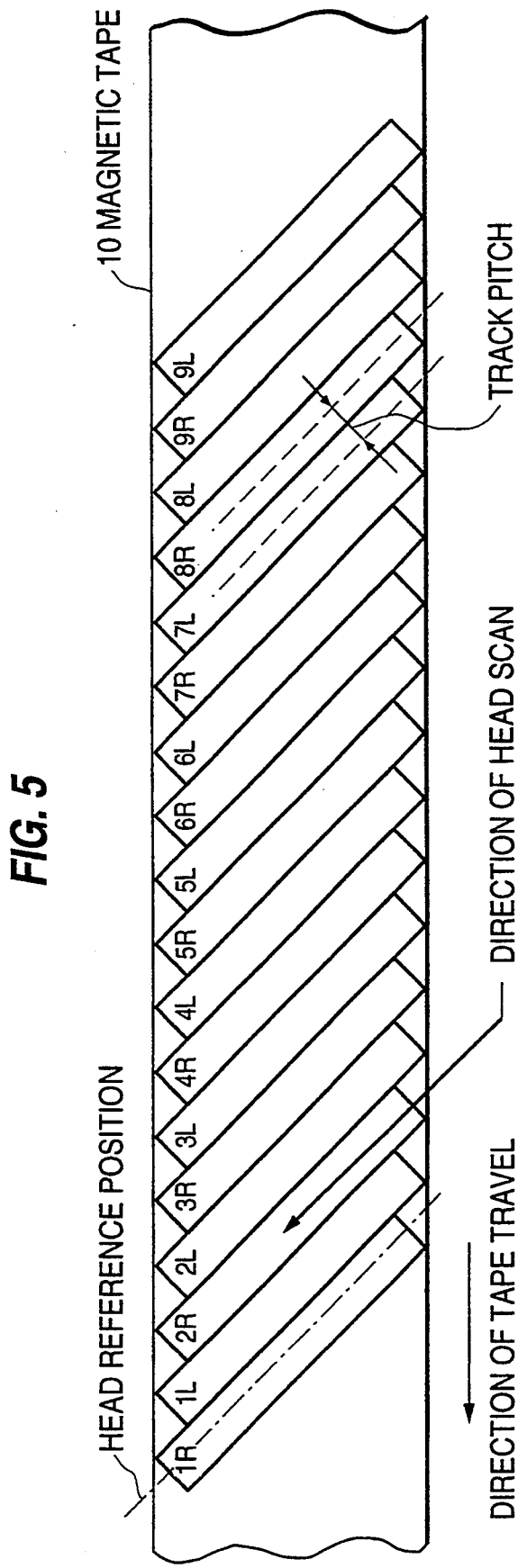
FIG. 5 is a pattern diagram of the track recorded on the magnetic tape.

During the high level period of the HSW signal, a first still pattern generator 16 produces a ramp signal, represented by the solid line in FIG. 2(c), which causes the video head to be displaced one track pitch. As shown in FIG. 5, the track pitch is a distance of vertical direction between center lines of adjoining slant track recorded on the magnetic tape 10. A first velocity pattern generator 14 produces a ramp signal represented by the solid line in FIG. 2(d), having a slope proportional to traveling speed of the magnetic tape 10, for the purpose of displacing the video head.

Figure 2B:
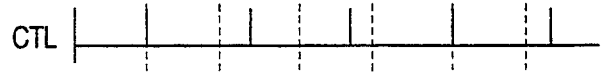

In the low level period of the HSW signal, a second still pattern generator 17 produces a ramp signal, represented by the dashed line in FIG. 2(c), which causes the video head to be displaced one track pitch. A second velocity pattern generator 15 represented by the dashed line in FIG. 2(d), has a slope proportional to traveling speed of the magnetic tape 10 and is also used to displace the video head. The tape position detector 13 detects traveling position information of the magnetic tape 10 using information from the sensor 8 and outputs a control signal as shown in FIG. 2(b).

A first phase pattern generator 18 produces an output signal indicating a position of the track recorded by the video head having the first azimuth angle and a second phase pattern generator 19 produces an output signal indicating a position of the track recorded by the video head having the second azimuth angle as shown by the chained and broken lines respectively in FIG. 2(e). The output signal of the first phase pattern generator 18 has a zero amplitude at the time that the tape position detector 13 outputs the control signal and then the amplitude increases in proportion to the traveling speed of the magnetic tape 10 in accordance with the output of the tape speed detector 12. The increasing amplitude returns to −1 track pitch when it reaches a +1 track pitch value, as shown in FIG. 2(e). The output signal of the second phase pattern generator 19 has the amplitude of −1 track pitch at the time that the tape position detector 13 outputs the control signal and then the amplitude increases in proportion to the traveling speed of the magnetic tape 10 in accordance with the output of the tape speed detector 12. The increasing amplitude returns to −1 track pitch when it reaches +1 track pitch value, and the amplitude starts to increase once again when the next control signal occurs. When the traveling direction of the magnetic tape 10 is reversed, the slope of outputs from the phase pattern generators 18 and 19 becomes negative and the amplitude returns to +1 track pitch when it reaches −1 track pitch.

When the HSW signal rises, the output amplitude of the first phase pattern generator 18 is stored to a first memory 21 or a second memory 23, as represented by the small black circles in FIG. 2(e). When the HSW signal falls, the output amplitude of the second phase pattern generator 19 is stored in memory 21 or 23, as represented by the cross marks of FIG. 2(e). Returning to FIG. 1, the head selector 24 has a track selection table 40 which determines, based on the speed and position information of magnetic tape 10, whether the first azimuth track (angle L) or the second azimuth track (angle R) will be used during the next rise in the HSW signal. The magnetic tape 10 supposes that it is traveling at a speed 1.5 times of that at which it was recorded. In that case, the pattern driving the video head is repeated with a 2 HSW signal period, resulting in four different conditions. The resulting four conditions can be distinguished from the phase relationship between the control signal and the HSW signal. By calculating the distance traveled from output of the control signal to rise or fall of the HSW signal, the track selection table 40 determines which of the four conditions is occurring and selects which azimuth track will be used during the next rise in the HSW signal. Furthermore, the track selection table can memorize a special video head corresponding to the condition selected, with that information is selected to appear as an output.

Moreover, the traveling speed of magnetic tape 10 can be used to determine the number of the current condition. By taking one phase relationship between the control signal and the HSW signal as a first condition and advancing the condition number each time there is a change of the HSW signal level until it becomes the specified number, the current condition can be determined.

The output of the head selector 24 controls the switching operation of a first switch circuit 20 such that either the output of the first phase pattern generator 18 or the second phase pattern generator 19 is stored in the first memory 21. A second switch circuit 22 and a second memory 23 operate in similar fashion as the first switch circuit 20 and the first memory 21 such as mentioned above.

FIG. 2 is a diagrammatic view illustrating waveforms occurring during the operation of the embodiment shown in FIG. 1. FIG. 2(a) shows the waveform of the head switching signal (HSW signal) produced by the scanner rotational timing pulse generator 11. FIG. 2(b) shows the waveform of the control signal (CTL signal) outputted by the tape position detector 13. The solid line of FIG. 2(c) shows the waveform of the ramp signal produced by the first still pattern generator 16, and a broken line of FIG. 2(c) shows the waveform of the ramp signal produced by the second still pattern generator 17. In FIG. 2(d), the solid line shows the waveform of the ramp signal produced by the first velocity pattern generator 14 and the broken line shows the waveform of the ramp signal produced by the second velocity pattern generator 15. The chain line of FIG. 2(e) shows the waveform of the ramp signal produced by the first phase pattern generator 18, and the broken line shows the waveform the ramp signal produced by the second phase pattern generator 19. The amplitude marked by the small black circles and the crosses in FIG. 2(e) are the phase compensation values stored to memory units 21 or 23 used to select the track for the video heads to be scan.

The solid line of FIG. 2(f) shows a driving pattern applied to the first movable unit 5. The driving pattern signal is an output signal from a first adder 25 which adds a still pattern signal from the first still pattern generator 16 shown by the solid line in FIG. 2(c), a velocity pattern signal from the first velocity pattern generator 14 shown by the solid line in FIG. 2(d), and a phase compensation value marked by small black circles in FIG. 2(e) on a phase pattern from the first phase pattern generator 18. The driving pattern signal is applied to the first movable unit 5 through a first driver 27 and a slip ring 29.

The broken line of FIG. 2(f) shows a driving pattern signal applied to the second movable unit 6. The driving pattern signal is an output signal from a second adder 26 which adds a still pattern signal from the second still pattern generator 17 shown by the broken line in FIG. 2(c), a velocity pattern signal from the second velocity pattern generator 15 shown by the broken line in FIG. 2(d), and a phase compensation value marked by the crosses in FIG. 2(e) on a phase pattern from the second phase pattern generator 19. The driving pattern signal is applied to the second movable unit 6 through a second driver 28 and the slip ring 29.

The embodiment shown in FIG. 1 comprises the first phase pattern generator 18 and the second phase pattern generator 19, providing the first movable unit 5 and the second movable unit 6 with phase compensation information. Therefore, the video heads can freely reproduce information of the track recorded on the magnetic tape in all rotation phase periods. Accordingly, this embodiment enables field, frame, and mixed field frame reproduction. Thus, the helical scan video tape recorder according to the present invention can reproduce a high quality picture having smooth movement.

Figure 3:
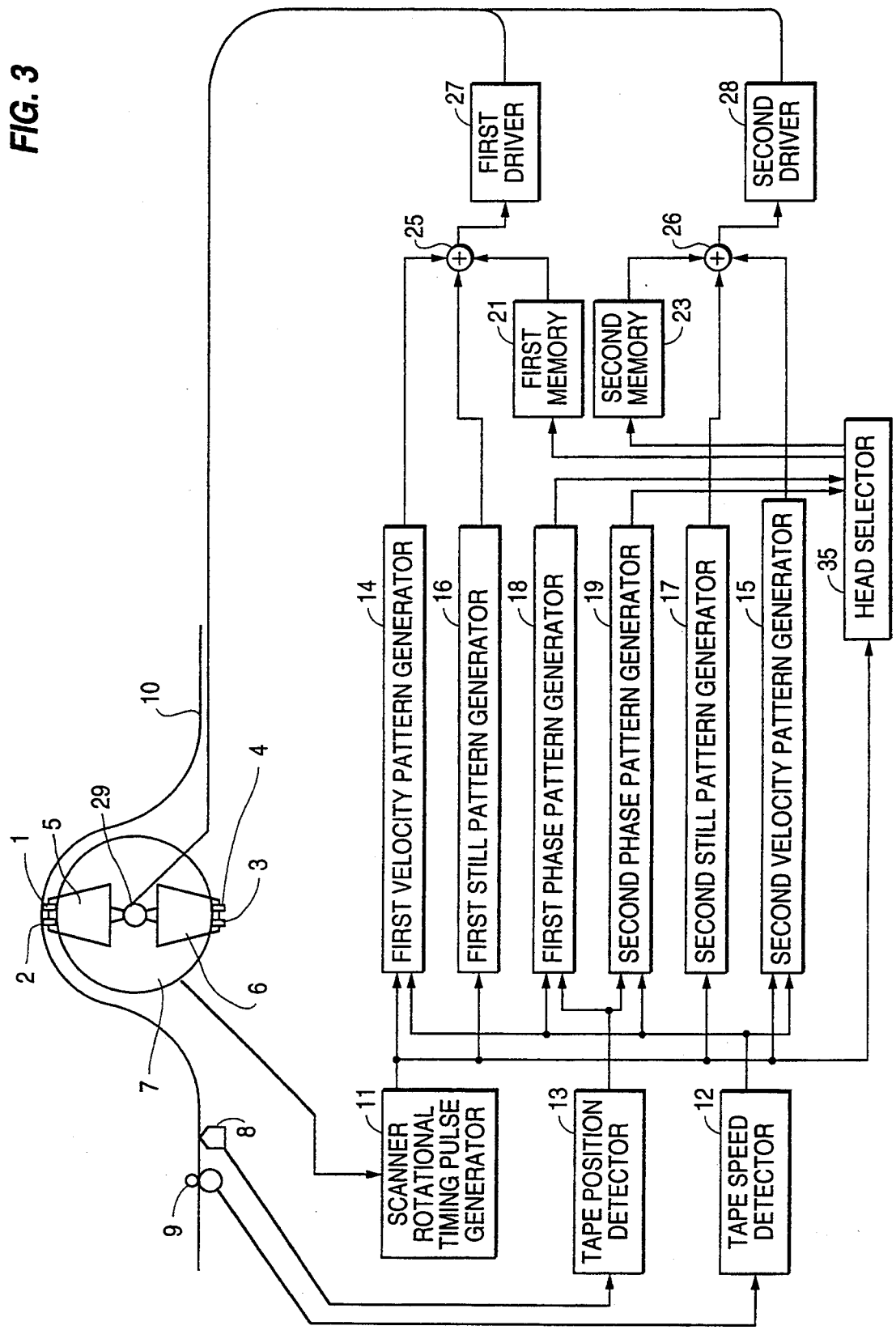
FIG. 3 is a block diagram of an alternative embodiment of the tracking apparatus for helical scan video tape recorders.

Another variation of the tracking apparatus is depicted in FIG. 3, and FIG. 4 is a diagrammatic view illustrating waveforms occurring during the operation of the embodiment of FIG. 3. FIG. 5 is a pattern diagram of the track recorded on the magnetic tape. In this embodiment the tape travel speed is 1.5 times that at which it was recorded.

The term "head reference position", which is mentioned in the following description, is a position scanned by a hypothetical fixed video head mounted on the scanning drum 7, which is equivalent to the center of the track recorded on the magnetic tape traveling at the normal speed as shown in FIG. 5.

In FIG. 3, a head selector 35 calculates the position of the video head scanning the magnetic tape by using outputs of the first phase pattern generator 18 and the second phase pattern generator 19, to determine which head video head should be used for reproduction. A distance error between the video head chosen for reproduction and the head reference position is determined by the head selector 35 and is added to outputs of phase pattern generators 18 and 19 and stored into the first memory 21 and the second memory 23.

Figure 4A:
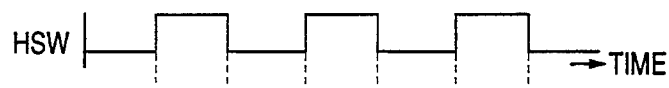
FIG. 4 is a diagrammatic view illustrating waveforms occurring during the operation of the embodiment shown in FIG. 3.
Figure 4B:
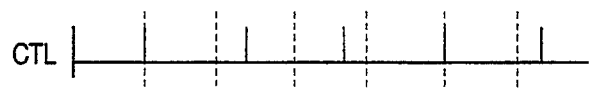

In FIG. 4(a), the period in which the value of the HSW signal is maintaining the high level is the first rotation phase period. The first video head 1 or the second video head 2 scan the magnetic tape 10 during this period. The output of the first still pattern generator 16 is the still pattern shown by the solid line in FIG. 4(c) having a zero amplitude at the time that the HSW signal rises, and is a ramp signal having −1 track pitch at the time that the HSW signal falls. The still pattern of FIG. 4(c) has a preliminary duration of ¼ HSW signal period and maintains the same slope as high level of the HSW signal. Therefore, an amplitude at the start point of the preliminary duration is +0.5 track pitch and depends on the time length of the preliminary duration. In addition, the amplitude maintains the value at the start point of the preliminary duration between the time when the HSW signal fell and the start time of the preliminary duration. Similarly, the output of the second still pattern generator 17 is the still pattern shown by the broken line in FIG. 4(c), having a phase difference of ½ HSW signal period from the first still pattern generator 16.

In FIG. 4(d), the output of the first velocity pattern generator 14 is represented by the solid line and the output of the second velocity pattern generator 15 is represented by the broken line. The output of the first velocity pattern generator 14 is a ramp signal having a slope proportional to traveling speed of the magnetic tape 10, having preliminary duration of ¼ HSW signal period before rise of the HSW signal. This preliminary duration has a slope proportional to traveling speed of the magnetic tape 10. In addition, the first velocity pattern generator 14 has a zero amplitude for the period from fall of the HSW signal to start of the preliminary duration.

Therefore, the output of the first velocity pattern generator 14 is a linear ramp signal which has zero amplitude at the start of the preliminary duration, an amplitude of +0.75 track pitch at the rise of the HSW signal, and an amplitude of +2.25 track pitch at the fall of the HSW signal. The output of the second velocity pattern generator 15 has a phase difference of ½ HSW signal period from the first velocity pattern generator 14.

Referring to FIG. 4(e), the chain line shows the output of the first phase pattern generator 18 and the broken line shows the output of the second phase pattern generator 19. The output of the first phase pattern generator 18 has a zero amplitude at the time the control signal is detected and the amplitude increases in proportion to the traveling speed of the magnetic tape 10 in accordance with the output of the tape speed detector 12. The increasing amplitude falls to −1 track pitch when it reaches to +1 track pitch. The output of the second phase pattern generator 19 has an amplitude of −1 track pitch at the time the control signal is detected and the amplitude increases in proportion to the traveling speed of the magnetic tape 10 in accordance with the output of the tape speed detector 12. The increasing amplitude falls to −1 track pitch when it reaches to +1 track pitch. When the direction of the magnetic tape 10 reverses, the slope of the phase pattern also reverses and the amplitude goes from −1 track pitch to +1 track pitch.

When the HSW signal falls, the head selector 35 calculates the traveling distance of the magnetic tape 10 during preceding ¼ HSW signal period using the output of the first phase pattern generator 18 or the second phase pattern generator 19. The head selector 35 estimates the traveling distance of the magnetic tape 10 during the next ½ HSW signal period and converts the traveling distance estimated into a corresponding track pitch amplitude. The estimated track pitch amplitude is added or subtracted to the outputs of the first phase pattern generator 18 and the second phase pattern generator 19 by 2 track pitch units in such a way that the amplitude of the outputs falls in the range of ±1 track pitch and the estimates values of the first phase pattern and the second phase pattern. The head selector 35 then compares the absolute value of the estimated values of the first phase pattern with that of the second phase pattern and selects the smaller value. This absolute value is used to select the video head to be used for the next high level duration of the HSW signal. When both absolute values are equal, the negative value is chosen for normal tape travel direction and the positive value is chosen for reverse tape travel direction in order to reduce displacement of the movable unit.

In the second embodiment, because the preliminary duration is ¼ HSW period, the head selector 35 estimates the traveling distance during the preliminary duration from the traveling distance for the preceding ¼ HSW period and subtracts the estimated value from the estimated value chosen by head selector 35 of the first phase pattern or the second phase pattern. The resulting value is then stored in first memory 21 as the estimated value for the start point of the preliminary duration. The first memory 21 holds the stored value until the start timing of the preliminary duration.

The head selector 35 performs fine adjustment of the estimated value of the phase pattern at the start of the preliminary duration. The head selector 35 receives the chosen output of the phase pattern at the start of the preliminary duration. The received phase pattern is compensated in amplitude by 2 track pitch units in such a way as to approximately equal the estimated value for the start point of the preliminary duration and the compensated value is stored into the first memory 21. This way, by storing output of the phase pattern at the start point of the preliminary duration into the memory instead of at the rise or fall of the HSW signal, the amplitude of the velocity pattern at the starting point of the preliminary duration can be zero.

When the above method is used, the outputs of the first phase pattern generator 18 and the second phase pattern generator 19 are compared at the rise of the HSW signal and the equivalent of the smallest absolute value is stored into the first memory 21.

The signal adding the outputs of the first velocity pattern generator 14, the first still pattern generator 16, and the first memory 21 through the first adder 25 is the driving pattern shown in FIG. 4(f). This driving pattern illustrates only the section in which the video head is scanning the magnetic tape 10. The driving pattern is amplified by the first driver 27, driving the first movable unit 5 through the slip ring 29. The second movable unit 6 is driven in a similar manner.

The following processing is carried out by the embodiment of FIG. 3 without fail when the first memory 21 stores data. When the driving pattern output from the first adder 25 has zero amplitude, the position of the first video head and the position of the second video head about the head reference position are a first relative height and a second relative height. In the case that the head selector 35 chooses the first phase pattern generator 18, the first memory 21 stores the sum of the compensated output of the first phase pattern generator 18 and the first relative height. In the case that the head selector 35 chose the second phase pattern generator 19, the first memory 21 stores the sum of the compensated output of the second phase pattern generator 19 and the second relative height.

Similarly, when the driving pattern output from the second adder 26 is zero amplitude, the position of the third video head and the position of the fourth video head about the head reference position are a third relative height and a fourth relative height. In the case that the head selector 35 chooses the first phase pattern generator 18, the second memory 23 stores the sum of the compensated output of the first phase pattern generator 18 and the fourth relative height. In the case that the head selector 35 chooses the second phase pattern generator 19, the second memory 23 stores the sum of the compensated output of the second phase pattern generator 19 and the third relative height.

Figure 4G:
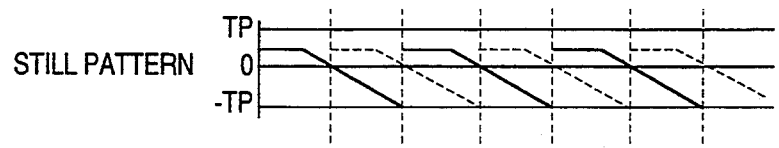
Figure 4G:
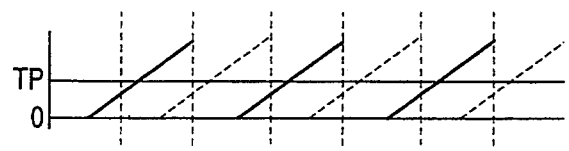
Figure 4G:
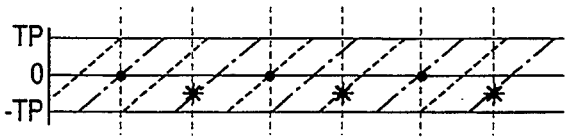
Figure 4G:
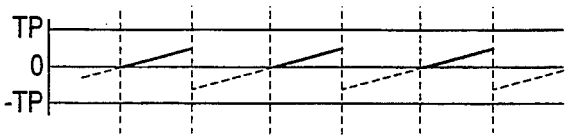

By using the above tracking apparatus, the recorded tracks are reproduced in the order of 1R, 1L, 2L, 3R, 4R, 4L, 5L, 6R, 7R, 7L, 8L, 9R,—and ⅔ tracks of all tracks can be reproduced. FIG. 4(g) shows the azimuth angle of the track reproduced and the video head used for reproducing.

The embodiment described above provides a number of significant advantages. The embodiment of FIG. 1 requires a large-scale track selection table so as to carry out a fine adjustment of the magnetic tape traveling speed. However, there is no need to use the track selection table in the embodiment of FIG. 3 because the head selector 35 estimates the track position at the start point of following rotation phase and determines the recorded track to be reproduced.

The second embodiment of FIG. 3 provides a smooth driving pattern at the start point of the rotation phase because the first memory 21 and the second memory 23 store one output of the first phase pattern generator 18 or the second phase pattern generator 19 at the start point of the preliminary duration. In addition, because the estimated start point position of the video head is held from an end point of the rotation phase period to the start point of the following preliminary duration, it is easy to produce a driving pattern which minimizes a vibration of the video head.

Additionally, since the head selector 35 chooses one of the video heads which can reproduce the track closest to the head reference position, it is possible to provide a video tape recorder which reproduces a smooth movement picture signal.

Because the recorded track position is predicted from the speed of the magnetic tape 10, at the start time of the following rotation phase period, the video head to be used for reproduction can be decided earlier, thus producing a smoother reproduction.

This smooth reproduction is because at the end of the rotation phase period, the head selector 35 decides the reproducing video head which uses in the following rotation period, therefore the video head is able to move early to the start point of the preliminary duration. Accordingly, it is possible use the stand-by time between rises in the HSW signal to move the video head thus reducing the vibration of the video head due to the movement thereof.

By choosing the reproducing head and modifying the error distance between the reproducing head position and the head reference position, the correction of the error which the video head mounts is easily conducted.

Variations on the embodiments described above are possible. For example, the embodiment of FIG. 3 may be modified so that the head reference position is an optional position in the vertical direction about the scanning lines of the hypothetical fixed video head. Accordingly, the phase pattern can be set up optionally if its amplitude is +2 track pitch centering around the modified head reference position. Additionally, the preliminary duration can be set up optionally if it is shorter than ½ HSW signal period.

In another variation, the first phase pattern is isolated from the second phase pattern, but the first phase pattern may be used to generate the second phase pattern. This modification can be accomplished using a converter to produce a phase pattern specified in range of ±1 track pitch by conducting arithmetic operations of addition and subtraction using the output of the first pattern generator 18.

The embodiments of FIG. 1 and FIG. 3 are set up to zero the phase pattern amplitude when the control signal is detected. However, when the magnetic tape is recorded using one video recorder and then reproduced using another video recorder an offset in the phase relationship between the CTL signal and the HSW signal occurs. In another variation, if an offset occurs, the resulting error is converted into a corresponding track pitch and is added to the output of the phase pattern generator or the head selector to correct the offset.

In yet another variation, the still pattern of FIGS. 2(c) and 4(c) can be a polygonal line or a curved form as opposed to the linear ramp form. Using an alternate form pattern for the still pattern and conducting the correction of a bending track can yield a more improved performance. Thus, even the difference between the reference track and the actual track which occurs due to a mechanical factor during a rotation period of the scanning drum can be corrected.

Of course, it should be understood that a wide range of changes and modifications can be made to the preferred embodiments described above. It is therefore intended that the foregoing detailed description be regarded as illustrative rather than limiting and that it be understood that it is the following claims, including all equivalents, which are intended to define the scope of this invention.

What is claimed is:

1. A tracking apparatus for helical scan video tape recorders, said tracking apparatus comprising:

a first movable unit and a second movable unit fixed on a scanning drum;

a first video head having a first azimuth angle and a second video head having a second azimuth angle, said both video heads being mounted on said first movable unit;

a third video head having said second azimuth angle, arranged 180° apart in a diametrically opposite position of said scanning drum about said first video head, said third video head being mounted on said second movable unit;

a fourth video head having said first azimuth angle, arranged 180° apart in a diametrically opposite position of said scanning drum about said second video head, said fourth video head being mounted on said second movable unit;

tape position detecting means for detecting a position of tracks recorded on said magnetic tape;

tape speed detecting means for measuring a traveling speed of said magnetic tape;

scanner rotational timing pulse generating means for detecting a rotational position of said scanning drum, producing a head switching signal;

first still pattern generating means for producing a pattern having a slope which said first or second video head is able to scan onto said recorded tracks when said magnetic tape is a stop condition, operating in accordance with an output of said scanner rotational timing pulse generating means at a first rotation phase period in which said first or second video head scans on said recorded tracks;

second still pattern generating means for producing a pattern having a slope which said third or fourth video head is able to scan onto said recorded tracks when said magnetic tape is at said stop condition, operating in accordance with said output of said scanner rotational timing pulse generating means at a second rotation phase period in which said third or fourth video head scans on said recorded tracks;

first velocity pattern generating means for producing a pattern having a slope proportional to said traveling speed of said magnetic tape in accordance with outputs of said tape speed detecting means and said scanner rotational timing pulse generating means at said first rotation phase period;

second velocity pattern generating means for producing a pattern having a slope proportional to said traveling speed of said magnetic tape in accordance with said outputs of said tape speed detecting means and said scanner rotational timing pulse generating means at said second rotation phase period;

first phase pattern generating means for producing a signal indicating a phase of a position of a track recorded by said first azimuth video head in accordance with outputs of said tape speed detecting means and said tape position detecting means;

second phase pattern generating means for producing a signal indicating a phase of a position of a track recorded by said second azimuth video head in accordance with outputs of said tape speed detecting means and said tape position detecting means;

head selecting means for choosing one of said video heads to scan said recorded tracks, and for deciding said recorded track to be reproduced, operating in accordance with outputs from said tape position detecting means, said tape, speed detecting means, and said scanner rotational timing pulse generating means;

first and second memory means for respectively storing one of outputs of said first phase pattern generating means or said second phase pattern generating means, said first and second memory means being controlled by an output signal of said head selecting means;

first adding means for adding outputs of said first still pattern generating means, said first velocity pattern generating means, and said first memory means;

second adding means for adding outputs of said second still pattern generating means, said second velocity pattern generating means, and said second memory means;

first driving means coupled to an output of said first adding means for driving said first movable unit; and second driving means coupled to an output of said second adding means for driving said second movable unit.

2. The tracking apparatus according to claim 1, wherein
said first and second still pattern generating means and said first and second velocity pattern generating means produce a pattern having a preliminary duration; and
said head selecting means stores in said first memory means output of said first phase pattern generating means or output of said second phase pattern generating means at a start point of a first preliminary duration which was set up in a period prior to said first rotation phase period, and stores in said second memory means output of said first phase pattern generating means or output of said second phase pattern generating means at a start point of a second preliminary duration which was set up in a period prior to said second rotation phase period.

3. The tracking apparatus according to claim 2, wherein said head selecting means estimates a value of a phase of track position of a first start point of a first preliminary duration when said first rotation phase period ended, stores in said first memory means said estimated value for said first preliminary duration until said first start point, estimates a phase of track position of a second start point of a following second preliminary duration when said second rotation phase period ended, storing said second memory means with estimated value for said second preliminary duration until said second start point.

4. The tracking apparatus according to claim 3, wherein said head selecting means chooses one of said video heads to be reproduced in a following first rotation phase period when said first rotation phase period ended, and chooses one of said video heads to be reproduced in following second rotation phase period when said second rotation phase period ended.

5. The tracking apparatus according to claim 1, wherein said head selecting means selects one of said video heads for scanning a track closest to a head reference position in a vertical direction toward the head scanning at a start time of said first rotation phase period and said second rotation phase period.

6. The tracking apparatus according to claim 5, wherein said head selecting means estimates track positions at start time of following first and second rotation phase period, choosing one of said video heads to be reproduced.

7. The tracking apparatus according to claim 6, wherein said head selecting means chooses one of said video heads to be reproduced in a following first rotation phase period when said first rotation phase period ended, chooses one of said video heads to be reproduced in a following second rotation phase period when said second rotation phase period ended.

8. The tracking apparatus according to claim 1, wherein
said first memory means stores the sum of a relative height between said first video head, said head reference position, and output of said first phase pattern generating means, or said first memory means stores the sum of a relative height between said second video head, said head reference position, and output of said second phase pattern generating means; and
said second memory means stores the sum of a relative height between said third video head, said head reference position, and output of said second phase pattern generating means, or said second memory means stores the sum of a relative height between said fourth video head, said head reference position, and output of said first phase pattern generating means.

9. The tracking apparatus according to claim 1, wherein said first still pattern generating means and said second still pattern generating means produce an output for correction of a bending track recorded on said magnetic tape.

10. A tracking apparatus for helical scan video tape recorders, said tracking apparatus comprising:
a first movable unit and a second movable unit fixed on a scanning drum;
a first video head having a first azimuth angle and a second video head having a second azimuth angle, said both video heads being mounted on said first movable unit;
a third video head having said second azimuth angle, arranged 180° apart in a diametrically opposite position on said scanning drum from said first video head, said third video head being mounted on said second movable unit;
a fourth video head having said first azimuth angle, arranged 180° apart in a diametrically opposite position on said scanning drum from said second video head, said fourth video head being mounted on said second movable unit;
a scanner rotational timing pulse generator coupled to said scanning drum and responsive to a rotational position of said scanning drum to produce a head switching signal;
a tape position detector configured to receive information from a magnetic tape engaged by said scanning drum, said tape position detector detecting a position of tracks recorded on said magnetic tape;
a tape speed detector configured to receive information from said magnetic tape measuring a traveling speed of said magnetic tape;
a first still pattern generator operating in accordance with an output of said scanner rotational timing pulse generator at a first rotation phase period in which said first or second video head scans said recorded tracks to produce a pattern having a slope which said first or second video head is able to scan said recorded tracks when said magnetic tape is at a stop condition;
a second still pattern generator operating in accordance with said output of said scanner rotational timing pulse generator at a second rotation phase period in which said third or fourth video head scans said recorded tracks to produce a pattern having a slope which said third or fourth video head is able to scan said recorded tracks when said magnetic tape is said stop condition;
a first velocity pattern generator operating in accordance with outputs of said tape speed detector and said scanner rotational timing pulse generator at said first rotation phase period to produce a pattern having a slope proportional to said traveling speed of said magnetic tape;
a second velocity pattern generator operating in accordance with said outputs of said tape speed detector and said scanner rotational timing pulse generator at said second rotation phase period to produce a pattern having a slope proportional to said traveling speed of said magnetic tape;
a first phase pattern generator operating in accordance with outputs of said tape speed detector and said tape position detector to produce a signal indicating a phase of a position of a track recorded by said video head at said first azimuth angle;

a second phase pattern generator operating in accordance with outputs of said tape speed detector and said tape position detector to produce a signal indicating a phase of a position of a track recorded by said video head at said second azimuth angle;

a head selector operating in accordance with outputs from said tape position detector, said tape speed detector, and said scanner rotational timing pulse generator, to select which one of said video heads scans said recorded tracks and to select which one of said recorded tracks to reproduce;

a first and second memory controlled by an output signal of said head selector to respectively store outputs of said first phase pattern generator or said second phase pattern generator;

a first adder coupled to receive outputs of said first still pattern generator, said first velocity pattern generator, and said first memory;

a second adder coupled to receive outputs of said second still pattern generator, said second velocity pattern generator, and said second memory;

a first driver coupled to an output of said first adder for driving said first movable unit; and a second driver coupled to an output of said second adder for driving said second movable unit.

11. The tracking apparatus according to claim 10, wherein
said first and second still pattern generator and said first and second velocity pattern generator produce a pattern having a preliminary duration; and
said head selector stores in said first memory output of said first phase pattern generator or output of said second phase pattern generator at a start point of a first preliminary duration which was set up in a period prior to said first rotation phase period, and stores in said second memory output of said first phase pattern generator or output of said second phase pattern generator at a start point of a second preliminary duration which was set up in a period prior to said second rotation phase period.

12. The tracking apparatus according to claim 11, wherein said head selector estimates a value of a phase of track position of a start point of a subsequent first preliminary duration when said first rotation phase period ends, stores in said first memory said estimated value for said subsequent first preliminary duration until said start point, estimates a phase of track position of a start point of a subsequent second preliminary duration when said second rotation phase period ended, storing said second memory means with estimated value for said second preliminary duration until said second start point.

13. The tracking apparatus according to claim 12, wherein said head selector chooses one of said video heads for reproduction in a subsequent first rotation phase period when said first rotation phase period ended, and chooses one of said video heads for reproduction in a subsequent second rotation phase period when said second rotation phase period ended.

14. The tracking apparatus according to claim 10, wherein said head selector selects one of said video heads for scanning a track closest to a head reference position in a vertical direction of a video head scanning said magnetic tape at a start time of said first rotation phase period and said second rotation phase period.

15. The tracking apparatus according to claim 14, wherein said head selector estimates track positions at start time of subsequent first and second rotation phase periods in order to select one of said video head for reproduction.

16. The tracking apparatus according to claim 15, wherein said head selector chooses one of said video heads for reproduction in a subsequent first rotation phase period when said first rotation phase period ended, chooses one of said video heads for reproduction in a subsequent second rotation phase period when said second rotation phase period ended.

17. The tracking apparatus according to claim 10, wherein
said first memory stores the sum of a relative height between said first video head, said head reference position, and output of said first phase pattern generator or said first memory stores the sum of a relative height between said second video head, said head reference position, and output of said second phase pattern generator; and
said second memory stores the sum of a relative height between said third video head, said head reference position, and output of said second phase pattern generator or said second memory stores the sum of a relative height between said fourth video head, said head reference position, and output of said first phase pattern generator.

18. The tracking apparatus according to claim 10, wherein said first still pattern generator and said second still pattern generator produce an output for correction of a bending track recorded on said magnetic tape.

19. A method of tracking for helical scan video tape recorders comprising the steps of:
affixing a first movable unit and a second movable unit to a scanning drum;
mounting on said first movable unit a first video head having a first azimuth angle and a second video head having a second azimuth angle;
mounting on said second movable unit a third video head having a first azimuth angle, arranged 180° apart in a diametrically opposite position on said scanning drum from said first video head, and fourth video head having a second azimuth angle, arranged 180° apart in a diametrically opposite position on said scanning drum from said first video head;
detecting a rotational position of a scanning drum;
producing a head switch signal indicative of said rotational position of said scanning drum;
detecting a position of tracks recorded on said magnetic tape;
measuring a traveling speed of said magnetic tape;
scanning said recorded tracks during a first rotation period to produce a pattern having a slope said first or second video head is able to scan on said recorded tracks when said magnetic tape is at a stop condition;
scanning said recorded tracks during a second rotation period to produce a pattern having a slope said third or fourth video head is able to scan on said recorded tracks when said magnetic tape is at said stop condition;
producing a pattern having a slope proportional to said traveling speed of said magnetic tape in accordance with said measured traveling speed and said detected rotational position during said first rotation phase;

producing a pattern having a slope proportional to said traveling speed of said magnetic tape in accordance with said measured traveling speed and said detected rotation position during said second rotation phase;

producing a signal indicating a phase of a position of a track recorded by said video head at said first azimuth angle in accordance with said detected track position and said measured traveling speed;

producing a signal indicating a phase of a position of a track recorded by said video head at said second azimuth angle in accordance with said detected track position and said measured traveling speed;

selecting which one of said video heads will scan said recorded tracks in accordance with said detected track position, said measured traveling speed, and said detected rotational position;

storing said signal indicative of a phase of a position of a track recorded by one of said video heads at either said first azimuth angle or said second azimuth angle in accordance with said selected video head;

adding said pattern produced by scanning the tracks during said first rotation period or said second rotation period, said pattern indicative of said respective traveling speed, and said respective stored signal, and outputting a signal indicative of said addition; and driving said first movable unit or said second movable unit in response to said signal indicative of said addition.

20. The method of tracking for helical scan video tape recorders in accordance with claim 19, wherein said the step of selecting which one of said video heads to scan said recorded tracks includes the further step of:

scanning a track closet to a head reference position in a vertical direction of the video head scanning at the start time of said first rotation phase period and said second rotation phase period.

* * * * *